United States Patent Office 3,708,259
Patented Jan. 2, 1973

3,708,259
METHOD FOR DYEING POLYAMIDE FIBERS WITH HALOTRIAZINYLMONOAZO DYESTUFFS
Nagib A. Doss, Albany, N.Y., assignor to GAF Corporation, New York, N.Y.
No Drawing. Original application Dec. 18, 1967, Ser. No. 691,134, now Patent No. 3,565,882. Divided and this application Feb. 14, 1971, Ser. No. 112,822
Int. Cl. D06p 3/10
U.S. Cl. 8—41 R        3 Claims

ABSTRACT OF THE DISCLOSURE

Method of dyeing nitrogenous fibers with a water soluble monoazo dyestuff containing a single acidic water solubilizing group and having the formula (1)
$$A-N=N-B-NH-C\begin{array}{c}N-C-Hal\\ \\ N=C-Y\end{array}$$

wherein A is a phenyl or naphthyl moiety containing a single acidic water-solubilizing group; B is (1)

(2)

$R^1$ is H, methyl, methoxy or acylamido; $R^2$ is H, methyl or methoxy; Hal is Cl or Br; Y is $NHR^3$, $SR^4$ or $OR^5$; and $R^3$, $R^4$ and $R^5$ are individually H, alkyl or phenyl.

---

This application is a division of application Ser. No. 691,134 filed Dec. 18, 1967, now U.S. Pat. 3,565,882 issued Feb. 23, 1971.

This invention relates to new monoazo dyestuffs, and more particularly to such dyestuffs containing only one water solubilizing group and one monohalotriazinyl group, and a method for dyeing nitrogenous fibers therewith.

Many dyestuffs have been disclosed in the prior art which are of the azo type and contain halotriazinyl radicals. Such dyestuffs are for the most part intended to be employed as fiber-reactive dyestuffs by application to cellulosic materials in the presence of alkali. U.S. Pat. No. 2,945,022 discloses monoazo and disazo dyestuffs containing a monohalotriazinyl radical and at least two strongly acid water solubilizing groups, and are applied to cellulosic materials in the presence of alkali. Such dyestuffs have however not been found to be particularly suited for dyeing nitrogenous fibers in the disclosed manner.

It is an object of this invention to provide dyestuffs which will not be subject to one or more of the above disadvantages. Another object of this invention is the provision of novel dyestuffs suitable for dyeing nitrogenous fibers. Still another object of the invention is the provision of a method for dyeing nitrogenous fibers with such dyestuffs. Other objects and advantages will become apparent as the description proceeds.

The attainment of the above objects is made possible by this invention which includes the provision of novel dyestuffs of Formula I above, and a method for dyeing nitrogenous materials, particularly fibrous material, therewith.

These dyestuffs of the invention are characterized by yielding excellent dyeings on nitrogenous fibers, especially nylon, having bright, full shades of excellent light and wash fastness properties.

In the above Formula I. A represents the residue of a diazotizable aromatic amine of the phenyl and naphthyl series containing a single acidic solubilizing group which is preferably a sulfonic acid group but may be a carboxylic acid group. The acylamido value for $R^1$ may be aliphatic or aromatic such as acetamido, propionamido, benzoylamido or the like. The alkyl value for $R^3$, $R^4$ and $R^5$ may be straight or branched and of any number of carbon atoms although lower alkyl groups of 1 to 4 carbon atoms are preferred. In general, the A moiety and the phenyl value for Y may if desired contain similar lower alkyl and/or lower alkoxy substituents of 1 to 4 carbon atoms. Similarly, the 11 atoms bonded to N atoms shown in the definition of said Formula I may be replaced by lower alkyl of 1 to 4 carbon atoms.

The dyestuffs of this invention may be prepared in conventional manner. Other such method involves diazotization of a diazotizable aromatic amine of the formula (II)        $A-NH_2$ and coupling the diazotized amine with an approximately equivalent amount of a coupling component of the formula (III)        $B-NH_2$ followed by condensing the resulting monoazo dyestuff with an approximately equivalent amount of the primary condensation product of cyanuric chloride or bromide with ammonia, an amine of the formula (IV)        $HNHR^3$ a thiol of the formula (V)         $HSR^4$ or an alcohol of the formula (VI)        $HOR^5$ and which condensation product has the formula $$Hal-C\begin{array}{c}N=C-Hal\\ \\ N-C-Y\end{array}N$$

(VII)

Alternatively, the same dyestuff may be reacted with cyanuric chloride or bromide and one of the two triazinyl halogens replaced with a Y group by reaction with an equivalent amount of ammonia, or an amine, thiol or alcohol of Formula IV, V or VI above.

As representative diazotizable aromatic amines of the Formula II above, there may be mentioned orthanilic acid
metanilic acid
sulfanilic acid
4-chlorometanilic acid
6-chlorometanilic acid
3-chlorosulfanilic acid
4-amino-o-toluenesulfonic acid
5-amino-o-toluenesulfonic acid
4-methoxymetanilic acid
6-methoxymetanilic acid
5-methoxyorthanilic acid
aminobenzoic acid
4-amino-2-naphthalenesulfonic acid
4-amino-1-naphthalenesulfonic acid
5-amino-1-naphthalenesulfonic acid
5-amino-2-naphthalenesulfonic acid
8-amino-2-naphthalenesulfonic acid
7-amino-1-naphthalenesulfonic acid
6-amino-2-naphthalenesulfonic acid.

As representative coupling components of Formula III above, there may be mentioned aniline
o-toluidine
m-toluidine
o-anisidine
m-anisidine
2,5-dimethoxyaniline
5-methyl-o-anisidine
3-benzoylamido or acetamido aniline
1-aminonaphthalene
N-methyl-1-naphthylamine
N-ethyl-1-naphthylamine.

As representative Y values insertable by reaction of the triazinyl halogen atom with ammonia or a compound of Formula IV, V or VI above, there may be mentioned lower alkyl amines such as methylamine, dimethylamine, ethylamine, diethylamine, propylamine, butyl amine; arylamines such as aniline, the toluidines, the anisidines, the cresidines, and the like; alkoxy such as methoxy, ethoxy, propoxy, butoxy; aryloxy, such as phenyloxy, tolyloxy, anisyloxy; thio derivatives, such as methylthio, ethylthio, propylthio, butylthio, phenylthio and the like.

The dyestuffs of this invention are highly advantageous for dyeing nitrogenous, organic polymers of natural or synthetic origin in any form such as in bulk or in shaped solid form such as films, fibers and filaments, and other articles. They are especially suitable for coloring nitrogenous fibers, particularly those containing repeating amide groups in the polymer chain, as for example wool, silk, synthetic linear super polyamides such as nylon 6 and 66 and polypyrrolidone, and polyurethanes of either the ordinary type such as from polyethylene adipate and tolylene diisocyanate, or the segmented spandex type such as from polyethylene oxide molecular weight 1000, tolylene or hexamethylene diisocyanate and propyleneglycol.

In general, the aforementioned nitrogenous materials may be colored by treatment in a weakly acid, neutral or weakly basic aqueous dye bath, for example having a pH of about 5 to 9, and at elevated temperature of at least about 150° F. up to the boil containing about 0.3 to 4% of one or more dyestuffs of the invention O.W.F. (on the weight of the fiber). Other usual dyeing assistants may of course be employed. The dyeing is then simply rinsed and dried.

The following examples are only illustrative of preferred embodiments of the invention and are not to be regarded as limitative. All parts and proportions referred to herein and in the appended claims are by weight unless otherwise indicated.

EXAMPLE 1

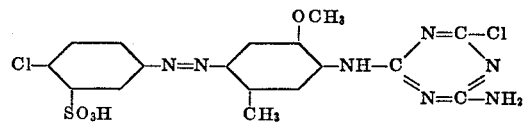

A 12.4 g. sample of the dyestuff prepared by coupling diazotized 6-chlorometanilic acid to 5-methyl-o-anisidine is added to 800 g. of water at 60° C. it is stirred to a smooth slurry and the pH adjusted to about 8 with caustic soda solution. It is clarified by a Nuchar (activated carbon) treatment, and iced to 0° C. with ice. To this is then added 33.5 g. of cyanuric chloride in 100 g. of acetone. After stirring at 0–5° C. for 15 minutes, the pH is gradually raised over a 2–3 hour period to about 7 at a temperature not over about 5° C. 45 g. of ammonium hydroxide 26° Bé is added. It is stirred for 1 hour, the temperature gradually raised to about 35° C. It is salted with 5% by volume salt solution, stirred overnight, filtered, washed and dried. A yellow dye is obtained which has excellent properties as a polyamide, polyurethane, wool, and silk dye.

In the same manner as in Example 1, the following dyes are prepared, corresponding to Formulae I, II and III above.

| Example | Diazotizable amine (A—NH$_2$) | Coupler (B—NH$_2$) | Hal. | Y | Color on nylon |
|---|---|---|---|---|---|
| 2 | 6-chlorometanilic acid | 5-methyl-o-anisidine | Cl | —NHC$_6$H$_5$ —(pOCH$_3$) | Greenish yellow. |
| 3 | do | do | Cl | —NHC$_6$H$_5$ | Do. |
| 4 | do | do | Cl | —NHCH$_3$ | Do. |
| 5 | do | do | Cl | —NHC$_2$H$_5$ | Do. |
| 6 | do | do | Cl | —OCH$_3$ | Do. |
| 7 | do | do | Cl | —SCH$_3$ | Do. |
| 8 | do | do | Br | —NH$_2$ | Do. |
| 9 | do | o-Anisidine | Cl | —NH$_2$ | Do. |
| 10 | do | do | Cl | —NHC$_6$H$_5$ | Do. |
| 11 | do | 2,5-dimethoxyaniline | Cl | —NH$_2$ | Yellow. |
| 12 | do | do | Cl | —NHC$_6$H$_5$ | Do. |
| 13 | do | N-methyl-o-anisidine | Cl | —NH$_2$ | Do. |
| 14 | do | do | Cl | —NHCl$_6$H$_5$ | Do. |
| 15 | Metanilic acid | o-Anisidine | Cl | —NH$_2$ | Do. |
| 16 | do | do | Cl | —NHC$_6$H$_5$ | Do. |
| 17 | do | do | Cl | —NHCH$_3$ | Do. |
| 18 | do | do | Cl | —NHC$_2$H$_5$ | Do. |
| 19 | do | do | Cl | —OCH$_3$ | Do. |
| 20 | do | do | Cl | —SCH$_3$ | Do. |
| 21 | do | do | Br | —NH$_2$ | Do. |
| 22 | do | m-Toluidine | Cl | —NH$_2$ | Do. |
| 23 | do | do | Cl | —NHC$_6$H$_5$ | Do. |
| 24 | do | 1-naphthylamine | Cl | —NH$_2$ | Reddish yellow. |
| 25 | do | do | Cl | —NHC$_6$H$_5$ | Do. |
| 26 | do | 2,5-dimethoxyaniline | Cl | —NH$_2$ | Do. |
| 27 | do | do | Cl | —NHC$_6$H$_5$ | Do. |
| 28 | 3-chlorosulfanilic acid | 5-methyl-o-anisidine | Cl | —NH$_2$ | Yellow. |
| 29 | do | do | Cl | —NHC$_6$H$_5$ | Do. |
| 29 | do | do | Cl | —NC$_6$H$_5$ \| CH$_3$ | Do. |

TABLE—Continued

| Example | Diazotizable amine (A—NH₂) | Coupler (B—NH₂) | Hal. | Y | Color on nylon |
|---|---|---|---|---|---|
| 30 | 4-chlorometanilic acid | 5-methyl-o-anisidine | Cl | —NH₂ | Yellow. |
| 31 | do | do | Cl | —NHC₆H₅ | Do. |
| 32 | 6-methylmetanilic acid | do | Cl | —NH₂ | Do. |
| 33 | do | do | Cl | —NHC₆H₅ | Do. |
| 34 | 5-methylmetanilic acid | do | Cl | —NH₂ | Do. |
| 35 | do | do | Cl | —NHC₆H₅ | Do. |
| 36 | 4-methylmetanilic acid | do | Cl | —NH₂ | Do. |
| 37 | do | do | Cl | —NHC₆H₅ | Do. |
| 38 | 6-methoxymetanilic acid | do | Cl | —NH₂ | Do. |
| 39 | do | do | Cl | —NHC₆H₅ | Do. |
| 40 | do | 6-methyl-o-anisidine | Cl | —NH₂ | Do. |
| 41 | do | do | Cl | —NHC₆H₅ | Do. |
| 42 | 4-aminosalicylic acid | Aniline | Cl | —NH₂ | Do. |
| 43 | do | do | Cl | —NHC₆H₅ | Do. |
| 44 | do | do | Cl | —NHCH₃ | Do. |
| 45 | do | do | Cl | —NHC₂H₅ | Do. |
| 46 | do | do | Cl | —OCH₃ | Do. |
| 47 | do | do | Cl | —SCH₃ | Do. |
| 48 | do | do | Br | —NH₂ | Do. |
| 49 | Naphthionic acid (1-aminonaphthalene-4-sulfonic). | 2,5-dimethoxyaniline | Cl | —NH₂ | Orange. |
| 50 | do | do | Cl | —NHC₆H₅ | Do. |
| 51 | 5-amino-2-naphthalenesulfonic acid. | do | Cl | —NH₂ | Do. |
| 52 | do | do | Cl | —NHC₆H₅ | Do. |
| 53 | 8-amino-2-naphthalenesulfonic acid | do | Cl | —NH₂ | Do. |
| 54 | do | do | Cl | —NHC₆H₅ | Do. |
| 55 | Metanilic acid | N-ethyl-1-naphthyl-amine | Cl | —NH₂ | Do. |
| 56 | do | do | Cl | —NHC₆H₅ | Do. |
| 57 | do | 3-acetamido aniline | Cl | —NH₂ | Do. |
| 58 | do | 3-benzoylamido aniline | Cl | —NH₂ | Do. |
| 59 | Orthanilic(2-amino benzene sulfonic). | o-Anisidine | Cl | —NH₂ | Yellow. |
| 60 | Metanilic | Aniline | Br | —NHC₁₀H₇ | Do. |
| 61 | do | o-Anisidine | Cl | —SH | Do. |
| 62 | do | do | Cl | —OH | Do. |

EXAMPLE 63

An aqueous dyebath is prepared containing 1% of the dye of Example I O.W.F. and 4% ammonium sulfate O.W.F. A swatch of nylon-66 is dyed in this solution at or near the boil for 1 hour, rinsed and dried. The nylon is dyed a level greenish yellow shade which is fast to light, washing and fulling.

EXAMPLE 64

An aqueous dyebath was prepared to contain 1.0% of the dye of Example 1 O.W.F., 15.0% sodium sulfate O.W.F., and 6.0% ammonium sulfate O.W.F. Wool is dyed in this bath at the boil for 1 hour, rinsed and dried. The wool is dyed a level greenish yellow shade which is fast to light, washing and fulling.

This invention has been disclosed with respect to certain preferred embodiments, and it will be understood that modifications and variations thereof will become obvious to persons skilled in the art and are intended to be included within the spirit and purview of this application and the scope of the appended claims.

I claim:

1. A method for dyeing polymeric fibers containing recurring amide groups in the polymer chain comprising treating such materials at an elevated temperature of at least about 150° F. in an aqueous medium containing a water-soluble monoazo dyestuff containing a single acidic water-solubilizing group selected from the class consisting of sulfonic acid and carboxylic acid moieties and having the formula:

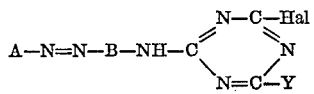

wherein

A is phenyl, naphthyl, or $C_{1-4}$ alkyl or alkoxy substituted phenyl or naphthyl containing a single acidic water-solubilizing group;

B is (1) 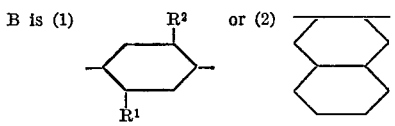 or (2)

$R^1$ is H, methyl, methoxy, lower alkanoylamido, or benzoylamido;
$R^2$ is H, methyl or methoxy;
Hal is Cl or Br;
Y is $NHR^3$, $SR^4$ or $OR^5$;

and $R^3$, $R^4$ and $R^5$ are individually H, $C_{1-4}$ alkyl or phenyl.

2. A method as defined in claim 1 wherein said material is nylon.

3. A method as defined in claim 1 wherein said material is wool.

References Cited

UNITED STATES PATENTS

| 2,945,022 | 7/1960 | Fasciati et al. | 8—1 E |
| 3,565,882 | 2/1971 | Doss | 260—153 |

GEORGE F. LESMES, Primary Examiner

T. J. HERBERT, Jr., Assistant Examiner

U.S. Cl. X.R.

8—41 B, 1 E